UNITED STATES PATENT OFFICE.

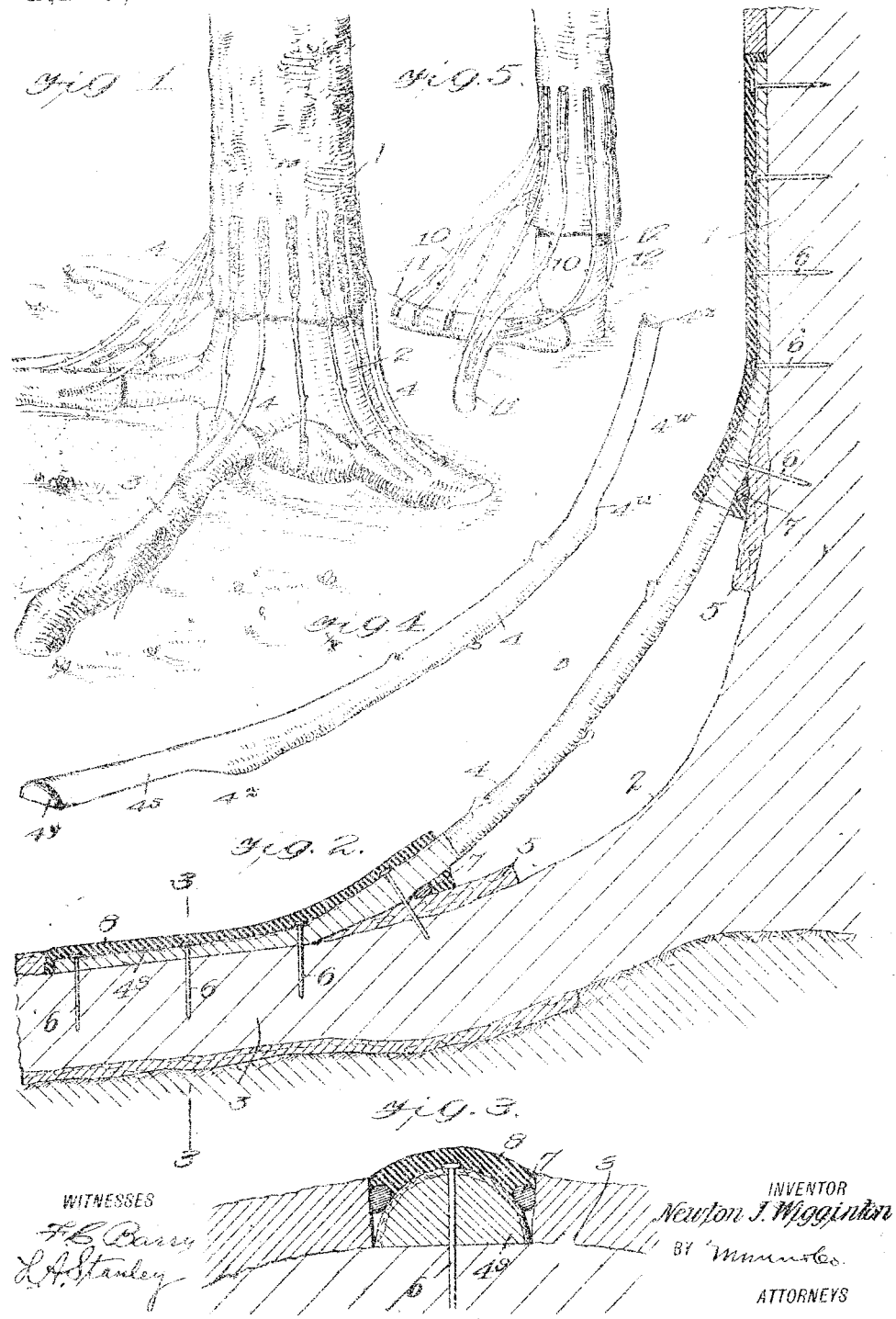

NEWTON J. WIGGINTON, OF WINCHESTER, VIRGINIA.

PROCESS OF BRIDGE-GRAFTING.

1,187,215.	Specification of Letters Patent.	Patented June 13, 1916.

Application filed June 29, 1914. Serial No. 847,833.

*To all whom it may concern:*

Be it known that I, NEWTON J. WIGGINTON, a citizen of the United States, and a resident of Winchester, in the county of Frederick and State of Virginia, have made certain new and useful Improvements in Processes of Bridge-Grafting, of which the following is a specification.

My invention relates to improvements in processes for bridge grafting and it consists in the various steps hereinafter enumerated.

An object of my invention is to provide a process of bridge grafting by means of which trees which have been completely girdled by mice, borers, rabbits, etc., can be restored to substantially its original condition so far as growth is concerned.

A further object of my invention is to provide a bridging process by means of which crown galls may be bridged over or cut away and the bridge made over the wound.

A further object of my invention is to provide a system of bridge grafting by means of which roots which have died out for some distance from the tree can be connected with the tree so as to deliver the flow of sap to any part of the trunk desired so that if a tree has lost its roots on one side connections can be made from the roots on the other side to the trunk in such a manner that the sap will be carried from the healthy roots and evenly distributed through the trunk.

A further object of my invention is to provide a process in which the bridging scions may be permanently attached to the root and to the trunk in such a manner that there is no danger of dislodging the scions, no matter what position the root may occupy with respect to the tree.

Other objects and advantages will appear in the following specification and the novel features of the device will be particularly pointed out in the appended claim.

My invention is illustrated in the accompanying drawings forming part of this application in which—

Figure 1 is a perspective view showing the manner in which my invention is carried out, Fig. 2 is an enlarged sectional view through a tree and root showing in detail the manner in which the scion is connected, Fig. 3 is a section on the line 3—3 of Fig. 2, Fig. 4 is a perspective view of a scion preparatory to grafting the same, and Fig. 5 shows a tree having a live root on one side and the manner of connecting the root with the tree for an even distribution of the sap.

My invention may be used in connection with the restoration of fruit trees or other trees which have been girdled as explained above. In Fig. 1 I have shown a tree whose trunk 1 has been completely girdled as shown at 2 in such a manner that the tree would eventually die unless artificial means of restoring the same were not used. In the form shown in Fig. 1 the earth is preferably cleared away so as to expose the living roots 3. I first prepare a scion 4 by cutting the ends square off, as shown at $4^x$ and $4^y$. The end $4^x$ is then cut in such a manner as to leave a semicylindrical portion $4^w$, a beveled portion $4^u$ being provided, as shown in Fig. 4. The opposite end has a similar semicylindrical portion $4^s$ and a beveled portion $4^z$. The bark 5 of the living root 3 is now channeled to receive one end of the scion. This channel, as will be observed, is not made from the edge of the girdled portion 2, but is a little distance away from the girdled portion in order to provide a good contact with the living bark. A semicylindrical portion of the scion such as that shown at $4^s$ is now placed in the channel in the bark of the root and nails 6 or other suitable fastening devices are driven through the scion into the root so as to hold the latter firmly in place. Soft material such as a candle wick 7 is now passed underneath the scion 4 and above the bark 5, as shown in Fig. 2, and this is brought along the sides of the semicylindrical portion $4^s$ and forced down between this portion of the scion and the adjacent walls of the channel, as shown in Fig. 3. A coating of wax 8 is now placed above the end of the scion as thus secured and at the end and underneath the scion where it leaves the bark. The scion is thus fastened in such a manner that there will be a flow of sap through the scion across the bottom of the semicylindrical portion. The upper part of the scion is protected by the wax, while the wicking keeps the wax from running in underneath the semicylindrical portion of the scion and thereby preventing a flow of sap from the root to the scion. The opposite end of the scion is now placed in a channel which is cut in the bark of the tree a little distance above the edge of the girdled portion 2. This end of the scion is provided with wicking 7 and with a wax coating 8 similar to that already described. Nails or securing members 6 are used in securing the upper end of the scion to the trunk of the tree 1.

I have described the operation of connecting one scion from the root to the tree top. It will be understood, however, that a plurality of scions are to be used as shown in Fig. 1 and that these scions are distributed so as to cause an even flow of sap around the trunk of the tree.

In Fig. 5 I have shown how a tree which has been completely girdled, and which is destitute of roots except on one side may be so restored as to resume its growth apparently unimpaired. In this instance it will be noted that the scions 10 are on the side of the tree which bears the living root 11, while the scions 12 are extended around so as to reach all sides of the tree, thereby causing an even distribution of the sap. In Fig. 5 it will be also apparent that I may attach more than one scion to one root, especially when the latter is large and healthy. When the scions are thus attached the roots and the scions are covered up and the tree is left for grafting in the ordinary manner.

This method of bridge grafting may not only be used for grafting girdled trees, but it may also be used for the purpose of providing limbs or branches from the main body portion of the tree on a side where branches have not hitherto grown. One advantage of this method lies in the fact that it dispenses with wedging the end of the scion underneath the bark of the tree and then binding or clamping the bark down upon the wedge portion. In the present method the scion may be applied in any position and may be of considerable length so as to bridge a crown gall or a wound caused by the removal of a crown gall.

I have grafted numerous trees by the method indicated above and in every instance I find that the tree immediately takes on a new lease of life and even if the tree has been completely girdled it at once begins to put forth new shoots and to gradually regain its former condition.

I claim:

The herein described process of bridge grafting, which consists in making a channel through the bark of each of the portions to be grafted, thereby exposing the wood, cutting portions of the ends of a scion away to leave an end having a flat side exposing the wood of the scion with a covering of bark, securing the ends of the scion in the channels with the flat sides of the scion next to the wood of the part to be grafted, inserting a sap conducting packing to close the space between the bark and the sides of the scion, and covering the secured ends of the scion with a sealing material.

NEWTON J. WIGGINTON.

Witnesses:
G. E. FAUSLER,
HARRY M. SARTELLE.